Dec. 16, 1924.
A. A. ALEXANDER
1,519,474
KEYING DEVICE FOR POWER TRANSMISSION
Original Filed May 26, 1921   3 Sheets-Sheet 1
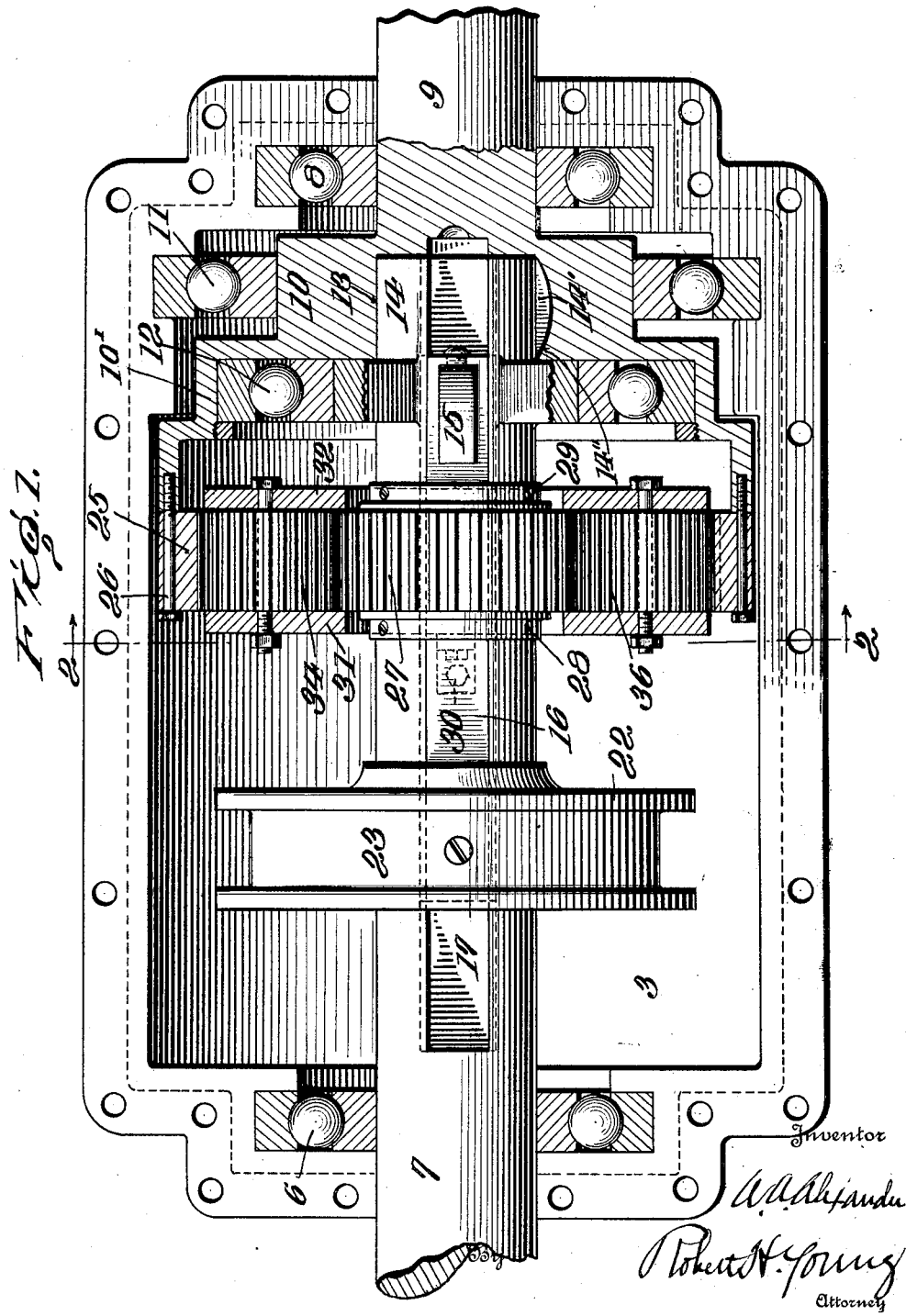

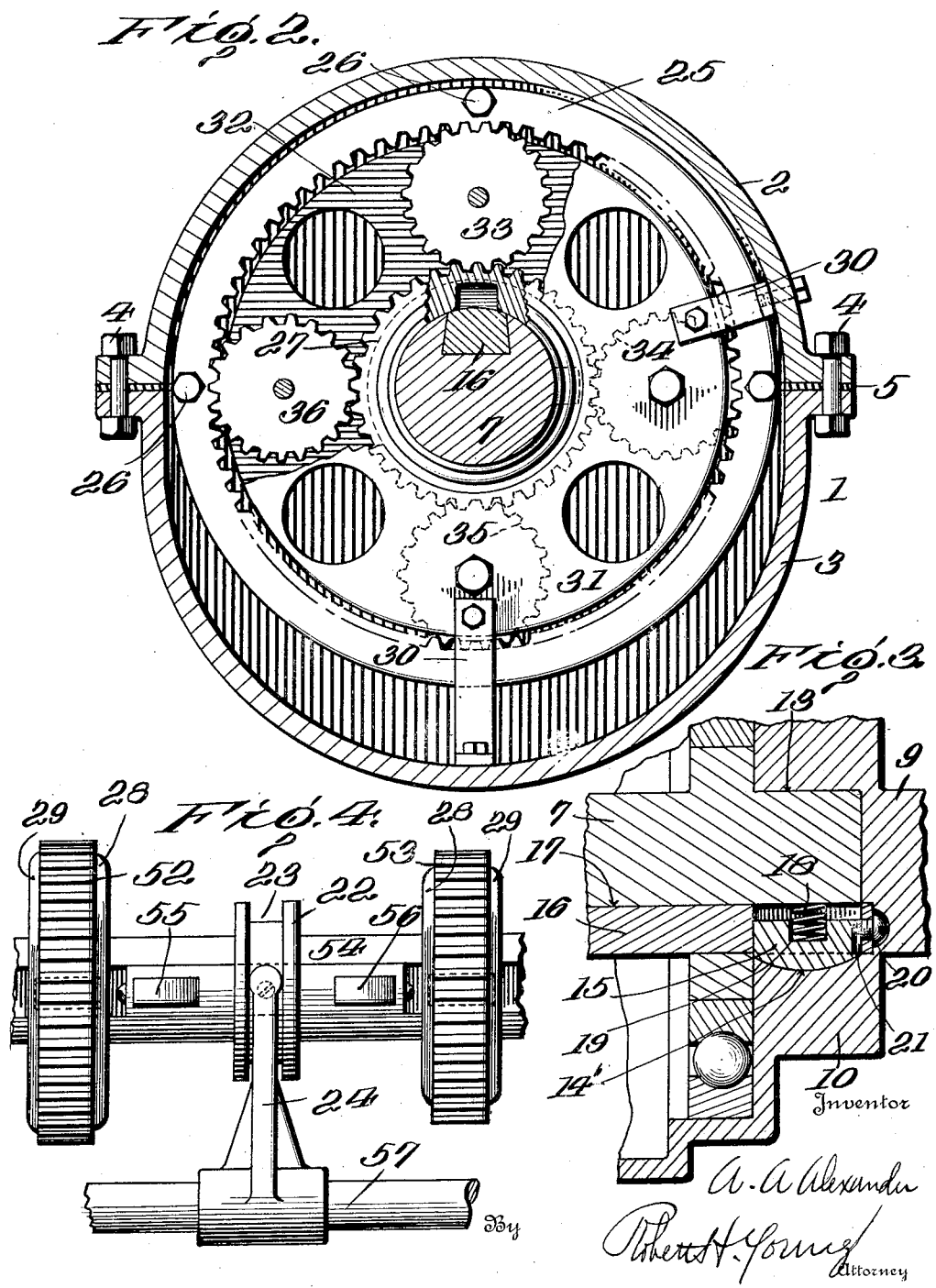

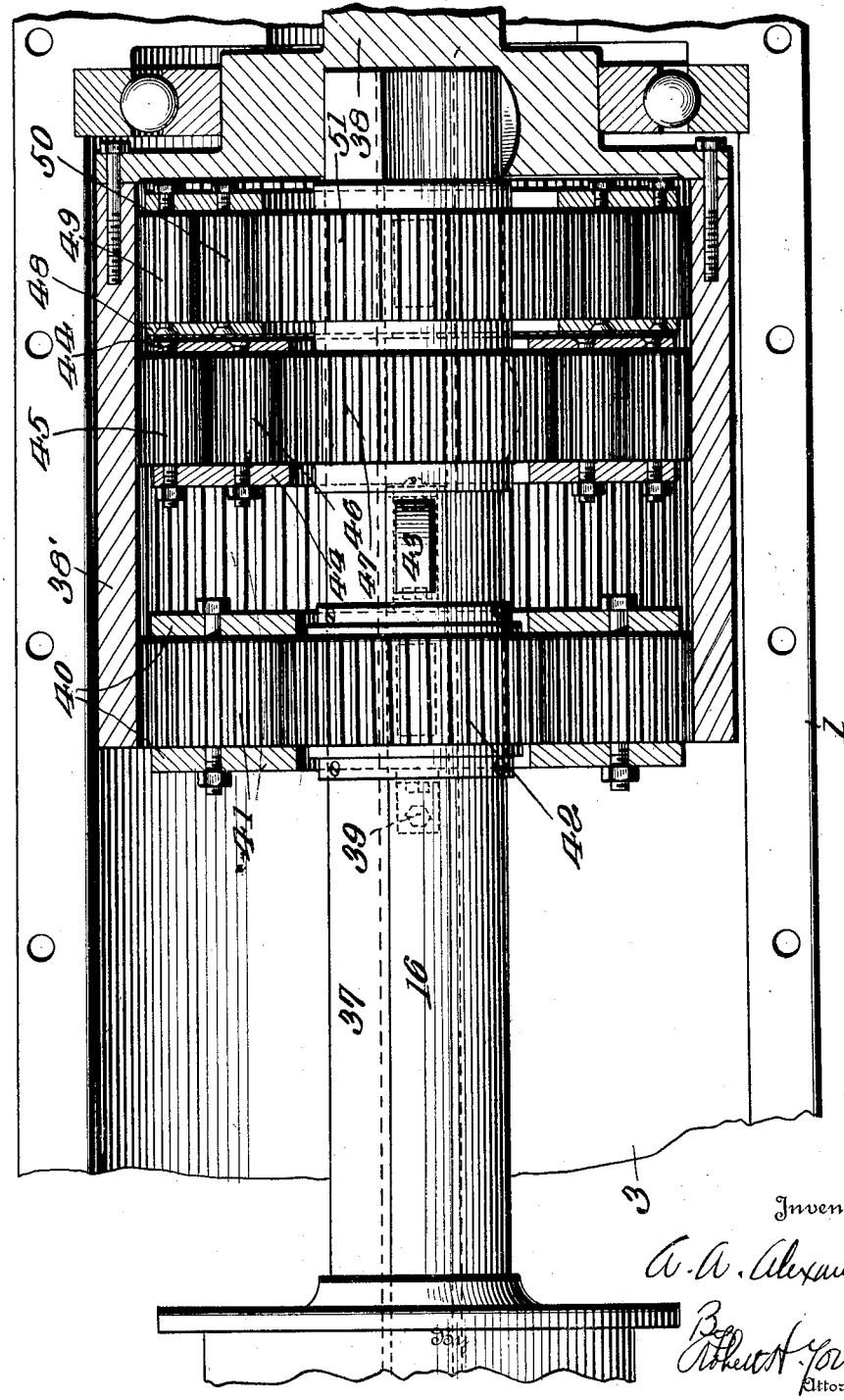

Patented Dec. 16, 1924.

1,519,474

UNITED STATES PATENT OFFICE.

ARTHUR A. ALEXANDER, OF NEW YORK, N. Y.

KEYING DEVICE FOR POWER TRANSMISSION.

Application filed May 26, 1921, Serial No. 472,781. Renewed May 10, 1924.

*To all whom it may concern:*

Be it known that I, ARTHUR A. ALEXANDER, a citizen of the United States, residing at New York city, in the county of New York and State of New York, have invented certain new and useful Improvements in Keying Devices for Power Transmission, of which the following is a specification.

My invention relates to new and useful improvements in a keying device for power transmission.

A major object of the invention is to provide a device for readily keying and unkeying, at will, a mechanical train, in consequence of which clutching and unclutching means may be dispensed with, and thus power may be transmitted by means of gearing, belting, rope drive, etc., with a minimum expenditure of fuel.

Another object of my invention is to provide a sliding bar, carrying a key, so devised that, at will, any gear or pulley on any shaft may be locked to become operative for the purpose of transmitting power, the gears, pulleys, etc., so controlled remaining permanently in mechanical interconnection.

A further object of my invention is to provide a power transmission device in which the driven shaft is actuated directly from the driving shaft, or through gearing either in the same direction as the driving shaft or in a reverse direction, and provides means whereby the locking key retains itself in any of its adjusted positions and can not work out by the rotary effort of either the driving or driven shafts.

A still further object of my invention is to provide a system of flanges or collars adjacent to the members to be keyed, whereby the key on the sliding bar is invariably placed in idling position just prior to the actual keying of the members to the shaft carrying the key and bar. It follows as a distinct advantage of the above construction that after the key has passed the idling collars the crown is the first portion of the depressed key that engages with the mating walls of the keying slot to lock the members to the drive shaft.

In the accompanying drawings representing an embodiment of my invention—

Figure 1 is a top plan view of a gear housing showing the upper closing portion removed;

Figure 2 is a vertical transverse sectional view taken on the line 2—2 of Figure 1, showing the gear carrying ring partly broken away;

Figure 3 is a longitudinal sectional view showing the locking members in position for direct drive between the driving and driven shafts;

Figure 4 shows the locking feature doubled for the purpose of associating either one of the pairs of gears in a counter-shaft form of gearing;

Figure 5 is a longitudinal view partly in cross section of a transmission adapted for three speeds forward and one speed rearward, embodying my invention as applicable to a particular form of gearing without a counter-shaft.

Referring now to the embodiments shown in the drawings, 1 represents a housing made in two sections 2 and 3, held together by bolts 4, and has the usual packing 5 to form a tight joint to prevent the leakage of the lubricant therefrom. The forward end of the housing is provided with a ball bearing 6, in which is rotatably mounted the drive shaft 7 which extends into the housing almost to the rear end. The rear end of the housing is provided with a ball bearing 8 in which is rotatably mounted the driven shaft 9. Said shaft at its inner end is provided with an enlarged portion 10 which has a ball bearing contact 11 with the interior of the housing. The said enlarged portion is provided with an outwardly and forwardly stepped cylindrical portion 10' terminating about midway the length of the housing. The interior of said cylindrical portion has ball bearings 12 arranged between it and the drive shaft structure, so that the shaft 7 is more firmly supported and prevented from any twisting action.

The enlarged portion 10 of the shaft has a circular recess 13, into which extends the outer end 14 of the shaft 7. This recess, at one side, is provided with a depression or key seat 14', which key seat has a curved bottom and straight side walls, and into which may be extended a correspondingly shaped key 15 carried by the spline 16 slidably mounted in the groove 17 in the shaft 7. This key, as shown, is normally outwardly spring pressed by the spring 18 bearing against the shaft 7, the outer end of which spring enters the recess 19 in the key. In order to limit the outward movement of the key, I provide the set screw 20, which enters the groove 21 in the key, as fully shown in Figure 3 of the drawings. The spline 16, as shown, is slidable in the groove 17 and when in the position shown in Figure 3, the driving shaft 7 is locked in direct drive relationship to the driven shaft 9. Owing to the shape of the key the spline is readily slidable in the groove 17 and easily enters or passes from the recess to respectively key or unkey the driving shaft and the driven shaft.

The spline 16 is moved in the groove by the member 22 rigidly carried thereby, and has a peripheral groove 23 into which extends the fork of the gear shaft lever 24, as shown in Figure 4.

The forward end of the cylindrical member 10' has bolted thereto an internal ring gear 25 by means of bolts 26, so that it is rigidly carried by the driven shaft, as shown in Figure 1 of the drawings. Loosely mounted upon the drive shaft 7, in transverse alinement with the gear 25, is the gear 27 which is held against longitudinal movement on the shaft by the flanges or collars 28 and 29. These collars also serve as means for forcing the locking member or key 15 within the spline. The collars closely fit the shaft 7 and as the spline is moved, the curved outer face of the key or locking member engages the collar and is forced inwardly until the crown thereof is engaged by the collar. The continued movement of the spline allows the locking member to be engaged by the gear 27 and to be held in its inwardly compressed position until the key seat comes opposite the same, when it snaps into the key seat and the shaft and gear are instantly locked together or a corresponding reverse action takes place on retraction.

The inner surface of the gear 27 is provided with a depression or key seat similar to the gear seat 14' in the driven shaft structure 10 to receive the key 15 and lock the gear 27 to the shaft when the spline is moved by the gear shaft lever in the manner heretofore described. From Figure 1, it will be seen that when the spline is moved in one direction the key locks the gear to the shaft and when moves oppositely locks the driving shaft to the driven shaft, but during the shifting of the same, when the key is in the position shown in Figure 1, the drive is neutral and therefore, and preferably, there is always provided a neutral position of the drive when going from one speed to another or when reversing.

Carried by the housing 1 is a series of inwardly extending brackets which support the rings 31 and 32. The gears 33, 34, 35 and 36 mesh with the ring gear 25 and the gear 27, as shown in Figure 2 of the drawings.

By this structure, it will be seen that when the key 15 is moved toward the shaft 9, it is depressed by the external periphery 14'', corresponding to the collars 28, 29, and continues depressed until it has been carried around by the driving shaft to a point where the key is in alinement with the seat 14', whereupon the drive shaft 7 is locked with the driven shaft 9, and a direct drive is obtained. Similarly, the key 15 may be moved by the shaft lever until the key enters the seat in the gear 27, whereupon the same will be locked to the drive shaft 7. The rotation of the gear 27 causes the gears 33, 34, 35 and 26 to rotate on their axes, but the rings carrying the same being supported by brackets or the like mounted on the housing, the rings are held against rotation and the rotation of the intermediate gears is imparted to the ring gear and causes the rotation of the driven shaft 9 in the opposite direction to that of the driving shaft 7 and reverse is obtained.

In Figure 5, I have shown the same principle applied to a similar gear set providing a multiplicity of speeds. In this form the driving shaft 37 and the driven shaft 38 are locked together in the same manner as that described in respect to Figure 1, and is the forward or direct drive and needs no further description.

Carried by the driven shaft is the internal ring gear 38' which is of an elongated form and is adapted to be in mesh with the intermediate gears of the low and second speed and also the intermediate gears of the reverse, which I shall now proceed to describe.

Carried by the housing 1 and the brackets 39 is the nest of rings 40, 44, 48. The rings 40 carry the intermediate gears 41, which gears mesh with the internal gear 38' and the gear 42 which latter gear is loosely mounted upon the shaft 37 to be locked thereto by the key 43 to form the reverse gear. Secured to the inner of the rings 40 is another set of rings to carry the two sets of gears 45 and 46. The inner set 45 meshes with the gear 47 and the outer set meshes with the ring gear 38'. Again, secured to the ring of the set is a second set of rings 48 which support the gears 49 and 50 and which are of a diameter less than the gears 45 and 46, whereby the second forward speed is obtained. The outer set of gears 49 mesh with the ring gear 38' and the inner set 50 meshes with the gear 51.

When the key 43 is in the position shown in Figure 5, the gears are in neutral. By moving this key to the left, the gear 42 is locked to the shaft 37 and the reverse gear is obtained. Moving the key to the right locks the gear 47 to the shaft 37, and low speed is obtained. Continuing this movement of the key to the right disengages it from the gear 47 and locks the gear 51 to the shaft, and second speed is obtained. The still further movement of the key 43 to the right disconnects the gear 51 from the shaft and locks the shaft 37 directly to the shaft 38 and high speed is obtained.

In Figure 4, I have shown the locking key device applied to the ordinary form of counter-shaft transmission. The two gears 52 and 53 are loosely mounted upon the shaft 54, each between collars, and the two keys 55 and 56, slidable on the gear shaft rod 57, are adapted to lock either of the gears to the shaft for the different speeds.

Having thus described my invention, what I claim as new and desire to secure by Letters Patent, is:

1. A keying device for power transmission comprising a driving member, a driven member, a rigid sliding bar carried in a groove in the surface of one of said members, the whole longitudinal outward surface of such bar being co-linear with the laterally adjacent surface of said carrying member, a spring-pressed locking member carried by the bar, and slidable radially with respect to said bar, and adapted to lock the driving and driven members together, said bar and locking member being free of interconnection other than the sliding contact, and means to limit the outward movement of the locking member from the bar.

2. A keying device for power transmission comprising a driving member, a driven member, a rigid sliding bar carried in a groove in the surface of one of said members, the whole longitudinal outward surface of such bar being co-linear with the laterally adjacent surface of said carrying member, a spring-pressed member carried by the bar, and slidable radially with respect to said bar and adapted to interlock with a recess in the driven member to lock the driving and driven members together, said bar and spring-pressed member being free of interconnection other than the sliding contact, and means to limit the outward movement of the spring-pressed member from the bar.

3. A keying device for power transmission comprising a driving member, a driven member, a rigid sliding bar carried in a groove in the surface of the driving member, the whole longitudinal outward surface of such bar being co-linear with the laterally adjacent surface of said driving member, an outwardly spring-pressed locking member carried by the bar and slidable radially with respect to said bar and adapted to be forced inwardly and interlock with a key-seat in the driven member to lock the driving and driven members together, said bar and locking member being free of interconnection other than the sliding contact, and means to limit the outward movement of the locking member from the bar.

4. A keying device for power transmission comprising a driving member, a driven member, a rigid sliding bar carried in a groove in the surface of the driving member, the whole longitudinal outward surface of such bar being co-linear with the laterally adjacent surface of said driving member, an outwardly spring-pressed locking member carried by the bar and slidable radially with respect to said bar and having a curved outer face adapted to engage the driven member for forcing the same inwardly to allow it to interlock with a key-seat in the driven member to lock the driving and driven members together, said bar and locking member being free of interconnection other than the sliding contact, and means to limit the outward movement of the locking member from the bar.

5. A gearing comprising a frame, a driving and a driven shaft rotatably mounted in the frame, a gear loosely carried by the driving shaft, a ring gear carried by the driven shaft, gears supported by the frame intermediate the gear and the ring gear, and a radially acting spring pressed key for directly locking the driving and driven shafts together, or for locking the gear to the drive shaft, whereby the driven shaft is operated through the gearing.

6. A gearing comprising a frame, a driving and driven shaft rotatably mounted in the frame, a gear loosely carried by the driving shaft, a ring gear carried by the driven shaft, gears supported by the frame and meshing with the ring gear and the first mentioned gear, and a radially moving spring pressed key for directly locking the driving and driven shafts together or connecting the gear to the drive shaft.

7. A gearing comprising a driving shaft, a gear loosely mounted thereon and having a key seat therein, a rigid sliding bar slidable longitudinally of said driving shaft, a spring pressed locking key carried by said bar and movable radially therein with respect to said driving shaft, and means for limiting the outward movement of said locking key.

8. A gearing comprising a frame attached to a driven shaft, a driving shaft, a gear connection between the driving shaft and driven shaft, said driving shaft extending into a recess in the driven shaft, a rigid sliding bar carried by the driving shaft, the whole longitudinal outward surface of such bar being co-linear with the laterally adjacent surface of said driving shaft, and a spring-pressed and radially sliding, locking member carried by the rigid bar adapted to lock either the driving shaft to the driven shaft or the gear to the driving shaft, said bar and locking member being free of interconnection other than a sliding contact, and means to limit the outward movement of the locking member from the bar.

9. A gearing comprising a driving shaft, a gear loosely mounted thereon and having a key seat therein, a rigid sliding bar slidable longitudinally of said driving shaft, a spring pressed locking key carried by said bar and movable radially therein with respect to said driving shaft, said bar and locking key being free of interconnection other than sliding contact therebetween, and means to limit the outward movement of the locking key.

10. A gearing comprising a frame attached to a driven shaft, a driving shaft having a longitudinal groove therein, the driven shaft having a recess to receive the end of the driving shaft and a key seat in the wall thereof, a rigid bar in said groove and a spring pressed radially sliding locking key carried by the rigid bar and adapted to enter said key seat and having beveled outer faces to depress it upon the longitudinal movement of the bar and means to limit the outward movement of the lock.

11. A keying device for power transmission comprising a driving member, a driven member, a rigid sliding bar carried in a groove in the surface of one of said members, a spring pressed locking member carried by the bar and slidable radially with respect to said bar and adapted to lock the driving and driven members together, and means limiting the outward movement of said spring pressed locking member.

12. A gearing comprising a housing, a driving shaft journaled therein, a driven shaft journaled in the housing and having a recess to receive the end of the driving shaft, said recess having a key seat in its walls, a ring gear carried by the driven shaft, a gear loosely mounted upon the driving shaft and having a key seat therein, a spring pressed locking key carried by the driving shaft and longitudinally movable therein and adapted to enter the key seat in either the driven shaft or the gear, rings rigidly supported by the housing intermediate the gear and the ring gear, and gears carried by the rings and meshing with the gear carried by the driving shaft and the ring gear.

13. A gearing comprising a housing, a driving shaft journaled therein, a driven shaft journaled in the housing and having a recess to receive the end of the driving shaft, a sliding spring pressed locking key adapted to lock the driving shaft and the driven shaft together, a series of gears loosely mounted upon the driving shaft and adapted to be locked thereon by the spring pressed locking key, a ring gear carried by the driven shaft, and rotatable gears rigidly carried by the housing and meshing with the ring gears and the gears carried by the driving shaft.

14. A keying device for power transmission comprising a driving member, a plurality of driven members, one of said latter members being a shaft co-axial with the said driving member, a key-carrying member with its whole outer surface co-linear with the laterally adjacent surface of the driving member and slidable longitudinally with respect to said driving member, a key slidable radially with respect to said carrying member, means to selectively lock said driving member to any predetermined driven member by means of said key, said key-carrying member and said key being free of interconnection other than by a sliding contact, and means to limit the outward movement of the key from the key-carrying member.

15. A keying device for power transmission comprising a driving member, a plurality of driven members mounted on said driving member, one of said latter members being a shaft co-axial with said driving member, a key-carrying member with its whole outward longitudinal surface co-linear with the laterally adjacent surface of the driving member and slidable longitudinally with respect to said driving member, a key slidable radially with respect to said key-carrying member, means to selectively lock said driving member to any predetermined driven member by means of said key, said key-carrying member and said key being free of interconnection other than by a sliding contact, and means to limit the outward movement of the key from the key-carrying member.

16. In combination with an enveloping housing, a driving shaft, and a driven shaft extending coaxially from said housing, an internal gear within said housing, and a selective keying means within said housing for selectively keying said driving shaft to said driven shaft directly, or indirectly keying said driving shaft to said driven shaft through said internal gearing; said shafts being longitudinally fixed with respect to said housing, said keying means comprising a key carrying member slidable longitudinally with respect to said shaft, and a spring pressed key slidable radially with respect to said carrying member.

17. In combination with an enveloping housing, a driving shaft and a driven shaft, extending coaxially from said housing and longitudinally fixed with respect thereto, a gearing within said housing and a single selective keying means within said housing for selectively keying said driving shaft to said driven shaft directly, or indirectly keying said driving shaft to said driven shaft through said internal gearing, said keying means comprising a key carrying member slidable longitudinally with respect to said shaft, and a spring pressed key slidable radially with respect to said carrying member.

18. In combination with a gear carrying housing, a driving shaft, and a driven shaft extending axially from said housing, an internal gear drive within said housing, and a selective spring pressed keying means within said housing for selectively keying said driving shaft to said driven shaft directly, or indirectly keying said driving shaft to said driven shaft through said internal gearing; said shafts being longitudinally fixed with respect to said housing.

19. A keying device for power transmission consisting of a rigid bar sliding in a groove in the surface of a shaft, the whole outward longitudinal surface of such bar being co-linear with the laterally adjacent surface of said shaft, which bar carries a spring-pressed key sliding radially with respect to said bar and said shaft and automatically retracting into and protruding from a recess in said bar, and means to limit the outward movement of said key from said bar, the said key being adapted by the sliding longitudinal movement of the bar to lock the shaft to another shaft or to lock a member of a transmission train to the shaft, selectively as predetermined, the bar and key being free of interconnection other than a sliding contact.

20. A keying device for power transmission comprising a driving member, a driven member, a rigid sliding bar carried in a groove in the surface of one of said members, a spring pressed member carried by said bar and slidable radially with respect thereto and adapted to interlock with a recess in the driven member to lock the driving and driven members together, said bar and said locking member being free of interconnection other than their sliding contact, and means to limit the outward movement of said spring pressed member.

21. In a power transmission device, driving means, driven means, a rigid sliding bar mounted in the surfacial groove in one of said means, a spring-operated member mounted on said bar and movable radially thereof, and a set screw extending through the end of said bar for the purpose of preventing undue relative motion between said bar and said spring-operated member.

22. In a power transmission device, driving means, driven means, a rigid sliding bar mounted in the surfacial groove in one of said means, a spring-operated member mounted on said bar and movable radially thereof, and a set screw extending through the end of said bar and into a recess in said spring-operated member for preventing undue relative motion therebetween.

23. In a power transmission device, a driving shaft, a gear revolubly mounted on said driving shaft but fixed against longitudinal motion thereof, a slot extending longitudinally of said shaft, a rigid sliding bar movable longitudinally in said slot, a spring-operated key mounted on said bar, a vertically extending slot in said key adapted to receive a set screw extending through the end of said bar for the purpose of preventing undue relative motion between said key and said bar, a key seat in said gear, and means for moving said bar and said key longitudinally in said slot to engage said key in said key-seat to lock said gear against rotative motion relative to said shaft.

ARTHUR A. ALEXANDER.